(12) United States Patent
Kneier et al.

(10) Patent No.: US 6,371,663 B1
(45) Date of Patent: Apr. 16, 2002

(54) MULTICHANNEL OPTICAL MODULE

(75) Inventors: Michael Kneier; Oliver Ölze; Klaus Schulz, all of Berlin (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/617,650

(22) Filed: Jul. 17, 2000

Related U.S. Application Data

(63) Continuation of application No. PCT/DE99/00176, filed on Jan. 15, 1999.

(30) Foreign Application Priority Data

Jan. 16, 1998 (DE) .......................................... 198 02 190

(51) Int. Cl.$^7$ .............................. G02B 6/36; G02B 6/43
(52) U.S. Cl. ............................. 385/88; 385/89; 385/92
(58) Field of Search ............................. 385/59, 60, 71, 385/72, 77, 78, 88, 89, 92

(56) References Cited

U.S. PATENT DOCUMENTS

| | | | |
|---|---|---|---|
| 4,279,465 A | | 7/1981 | Vojvodich |
| 4,895,425 A | * | 1/1990 | Iwano et al. ................... 385/60 |
| 5,028,110 A | | 7/1991 | Plummer |
| 5,093,881 A | | 3/1992 | Bortolin et al. |
| 5,230,030 A | | 7/1993 | Hartman et al. |
| 5,325,454 A | * | 6/1994 | Rittle et al. .................... 385/76 |
| 5,473,716 A | | 12/1995 | Lebby et al. |
| 5,528,408 A | | 6/1996 | McGinley et al. |
| 5,577,146 A | | 11/1996 | Musk |
| 5,940,561 A | * | 8/1999 | Dean, Jr. et al. .............. 385/60 |

FOREIGN PATENT DOCUMENTS

| | | |
|---|---|---|
| EP | 0 226 274 A2 | 6/1987 |
| EP | 0 566 900 A1 | 10/1993 |
| EP | 0 613 032 A2 | 8/1994 |
| EP | 0 618 468 A1 | 10/1994 |

OTHER PUBLICATIONS

Japanese Industrial Standard: "F04 Type Connectors for optical Fiber Cords".
Siemens Magazine: "FDDI Low Cost Tansceiver", Ref. No. A–23001–G40–P024–X–7600, 1993.

* cited by examiner

*Primary Examiner*—Hemang Sanghavi
*Assistant Examiner*—Omar Rojas, Jr.
(74) *Attorney, Agent, or Firm*—Herbert L. Lerner; Laurence A. Greenberg; Werner H. Stemer

(57) ABSTRACT

The module has a connection port with a lock and a holding sleeve adapted to receive an SC connector. Alignment aids align the connector in such a way that optical conductor ends that extend in a common plane within the connector come to lie in a prescribed position. The module includes a plurality of electrooptical transducers which are assigned to the one connection port and are aligned with the prescribed relative position of the longitudinal plane via waveguides. When the connector pin is inserted, each transducer is individually coupled to a respective end of one of the optical conductors.

12 Claims, 2 Drawing Sheets

MULTICHANNEL OPTICAL MODULE

CROSS-REFERENCE TO RELATED APPLICATION

This is a continuation of copending International Application PCT/DE99/00176, filed Jan. 15, 1999, which designated the United States.

BACKGROUND OF THE INVENTION

Field of the Invention

The invention lies in the field of electrooptical data transmission. For the purpose of electrooptical data transmission, use is made of transmitting and/or receiving units which are generally also denoted as electrooptical modules. The modules convert electrical signals into optical signals and/or optical into electrical signals. The actual signal conversion is effected by electrooptical transducers which can, for example, be constructed as laser diodes (transmitters) or photodiodes (receivers) and in each case have transducer surfaces which are also denoted as optically active zones.

For data transmission by means of optical conductors, the modules can be equipped with mechanical coupling devices for alignment with and mechanical connection to an optical conductor connector. Those coupling devices will be referred to below as connection ports or receptacles. The term optical conductor is to be understood within the framework of the present invention to include all elements such as, for example, glass fibers or plastic fibers which are suitable for directional relaying of optical waves.

The SIEMENS House Journal [Siemens-Firmenzeitschrift]"FDDI Low-Cost Transceiver" (Ref. No. A 23001-G40-P 024-X-7600), 1993 discloses an electrooptical module which has a separate receiving channel and a separate transmitting channel. The known module is equipped for each channel with a separate, individual connection port. Each connection port has in each case a centering sleeve for holding an optical conductor connector pin, and latching arms as locking elements which cooperate with corresponding undercuts on the connector housing. Mechanical fixing of the inserted connector in the respective port is thereby ensured. The connector pins are constructed as standardized pins (ferrules) and in each case hold in a central longitudinal bore a single optical conductor which terminates at the connector pin end face. The centered optical conductor guidance does not require rotary alignment or fixing of the connector pin.

As regards their geometries and their dimensions relevant to the respective connector, the holding sleeve and the mechanical lock are configured in accordance with the Japanese Industry Standard JIS-C-5973-1990. Inter alia, this standard stipulates the length and the diameter of the connector pin, the connector housing dimensions and the position and shape of the shaped elements which cooperate with the mechanical lock of the connection port. Such a standard connector is denoted in general as an SC connector. A connection port constructed for coupling to such an SC connector is therefore denoted as an SC connection port or SC receptacle.

As the prior art transceiver also shows, in the case of such configurations there is thus provided for each transmission channel a separate SC connection port with the aid of which in each case a single electrooptical transducer transmits over a waveguide into the optical conductor end face (transmitter) and receives radiation emitted from the end face (receiver).

As the data volumes to be transmitted increase, there is a greater need for parallel data transmission between two locations, or at least for the possibility of receiving and transmitting in parallel at a location. In principle, the use of an appropriate plurality of single-channel modules is appropriate for satisfying this need, and this has also become accepted in many applications.

A further possibility is to develop special forms of plugs. In a prior art multichannel optical module, a plurality of electrooptical transducers are assigned to a connection port. The connection port serves to hold and lock a plug which contains a plurality of optical conductors. Via waveguides, the transducers are aligned next to one another with a coupling plane running perpendicular to the plugging direction. The connection port has a holder for the plug and locking elements cooperating mechanically with the plug. For the purpose of mutual alignment of the connection port and plug—in which the optical conductors run along a longitudinal plane—the holder is simultaneously constructed as an alignment aid which cooperates with a corresponding configuration of the plug in such a way that in each case a transducer can be individually coupled to an end of one of the optical conductors in the region of the coupling plane. In this case, the mutual alignment of the connection port and plug is performed via self-closure of the plug in the holder. In order for it to be possible to insert the plug into the holder of the connection port and at the same time to keep nevertheless to low coupling losses, it is necessary to observe very small maximum deviations (tolerances) from the nominal dimensions during manufacture. Upon making contact with the light entry and/or light exit surfaces of the waveguides, the plug cannot fall back axially. In the case of frequent plugging cycles, in particular, the end faces of the optical conductor ends are therefore subjected to an increased risk of damage (see published European patent application EP 0 618 468 A1).

However, with regard to the space requirement which rises correspondingly with a rising number of modules, it is also desirable to be able to offer other solutions. In this case, it ought to be possible in the interest of the user to continue to handle the modules, for example during the processes of packing, testing and mounting, with similar and, preferably with the same devices.

SUMMARY OF THE INVENTION

The object of the invention is to provide a multichannel optical module which overcomes the above-noted deficiencies and disadvantages of the prior art devices and methods of this kind, and which, in conjunction with a substantially reduced space requirement or substantially increased module functionality/number of channels can continue to be handled in the accustomed way and can easily be coupled, as before, to the optical conductors to be connected.

With the above and other objects in view there is provided, in accordance with the invention, a multichannel optical module for receiving a connector of the type having a connector housing with shaped elements and a substantially cylindrical connector pin in the housing with a plurality of optical conductors arranged in a central longitudinal plane, the module comprising:

a housing formed with a connection port for receiving a connector along a plug-in direction and locking the connector therein;

a plurality of electrooptical transducers assigned to the connection port, the transducers being optically aligned via waveguides next to one another with a coupling plane oriented perpendicular to the plug-in direction;

the connection port having a cylindrical holding sleeve for a connector pin of the connector, and locking elements cooperating mechanically with shaped elements of the connector housing;

alignment aids formed on the holding sleeve for mutually aligning the connection port and the connector pin of the connector, the alignment aids cooperating with corresponding alignments aids on the connector pin such that in the region of the coupling plane are respective the transducer is coupled individually to an end of a respective one of the optical conductors;

the waveguides extending in a common coupling member and spreading open toward the transducers.

In accordance with an added feature of the invention, the alignments aids are longitudinal webs or ribs constructed on the inside of the holding sleeve.

In accordance with an additional feature of the invention, the holding sleeve has a defined longitudinal axis and the alignment aids are centering pins arranged on both sides of the longitudinal axis of the holding sleeve.

In other words, the solution essentially provides to configure the connection port in a way known per se such that a connector pin which contains a plurality of optical conductors can be held and, in so doing, to ensure in a novel way the centering between the plug and connection port by means of a cylindrical configuration previously customary only for single-pole plugs, and to provide the interlocking cylindrical components with appropriate alignment aids for the purpose of defined alignment of the waveguides and the optical conductors to be coupled, the waveguides via which the transducers are aligned with a coupling plane running in a common coupling member which spreads open the course of the waveguide on the transducer side.

The term "alignment aids" is to be understood as all components which recognizably fulfill for the person skilled in the art the aim of mutual positioning with corresponding geometries of the connector. Members with elongated geometries in particular prove to be suitable alignment aids, for example cylindrical pins, pins or rods having a polygonal cross section, or bolts which are arranged on both sides of the longitudinal axis of the holding sleeve, or else longitudinal webs or longitudinal ribs which are constructed on the inside of the holding sleeve.

A substantial advantageous aspect of the module according to the invention consists in that it is possible to couple a plurality of optical conductor ends with the aid of a single connection port. It is particularly advantageous in this case that because of the configuration of the connection port in accordance with an SC connector the optical conductors can be coupled in the previously customary and controlled way to the module and/or to the optical transducers contained therein.

By contrast with conventional development tendencies, the module according to the invention therefore departs from the avenue of continuous miniaturization in conjunction with retaining the principle of the previous basic design, and turns, rather, to a new connection arrangement and connection configuration using the principle of the SC connection.

Consequently, in the case of the module according to the invention a single connection port can be used to couple a plurality of optical conductor ends, which permits the module functionality to be doubled or multiplied without changing the housing design. Consequently, it is possible either to reduce the design by a factor of at least 2—that is to say at least to halve the required housing basic area in order to implement a so-called small form factor (SFF) module—or correspondingly to increase the packing density or the number of channels.

In accordance with another feature of the invention, the connector terminates two or four optical conductors at the end. Correspondingly, the module has two or four transducers. The invention permits a further spacing-apart of the transducers than is provided by the lateral spacing of the optical conductor ends.

In accordance with again another feature of the invention, the transducers are vertically emitting laser transmitters. The lasers preferably transmit at an emission wavelength of 850 nm or 1300 nm. This is particularly advantageous from a design point of view. This permits, for example, an up-ended arrangement of printed circuit boards carrying a plurality of transducers in each case, the transducers preferably being situated with their optically active zones opposite.

In accordance with a further feature of the invention, there is provided a module assembly comprising two of the above-outlined modules. The transducers in one of the modules are transmitters, and the transducers of the other module are receivers.

In accordance with again a further feature of the invention, there is provided a common housing that accommodates the two modules.

In accordance with a concomitant feature of the invention, the common housing has a base area not exceeding 26 mm*40 mm, preferably not exceeding 25.40 mm*39.12 mm.

In other words, the module according to the invention is preferably applied in module arrangements having two or more modules. In the case of the use of two modules, the previously customary size of module housing of the transceiver described at the beginning, for example, can advantageously be retained, a doubling or multiplying of the channel capacity being achieved in accordance with the number of the optical conductor ends respectively guided parallel to one of the connection ports. It is preferred in this case for one of the modules to be fitted with transducers constructed as transmitters, and the other module is fitted with transducers constructed as receivers. The module arrangement can preferably have the two modules in one common housing whose base area does not fall below 26 mm×40 mm, preferably 25.40 mm×39.12 mm.

Other features which are considered as characteristic for the invention are set forth in the appended claims.

Although the invention is illustrated and described herein as embodied in a multichannel optical module, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
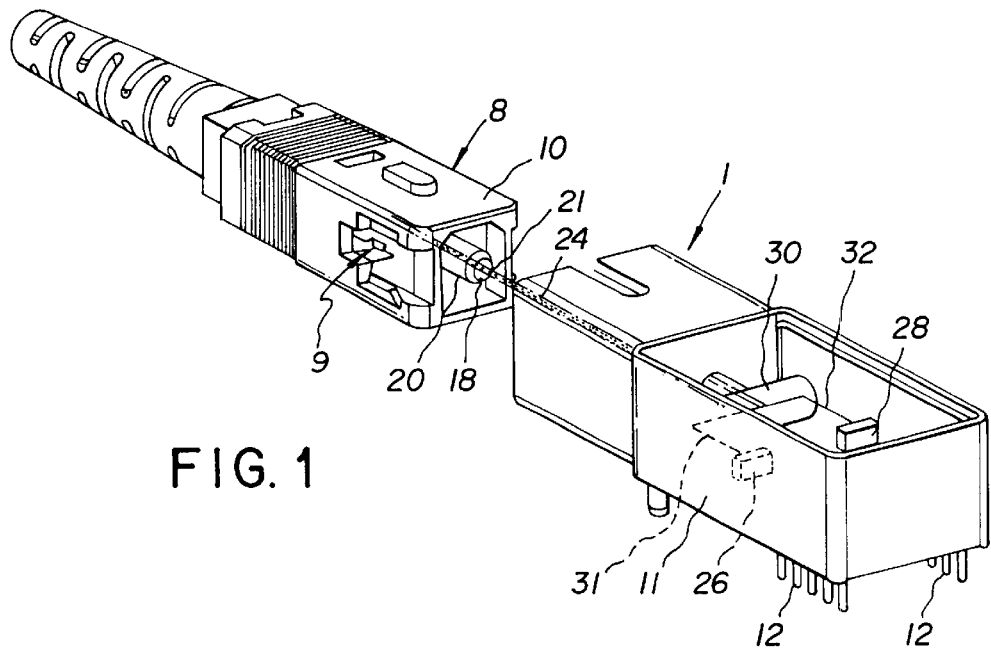
FIG. 1 is a perspective view of a module with an opposite connector as coupling partner.
Figure 2:
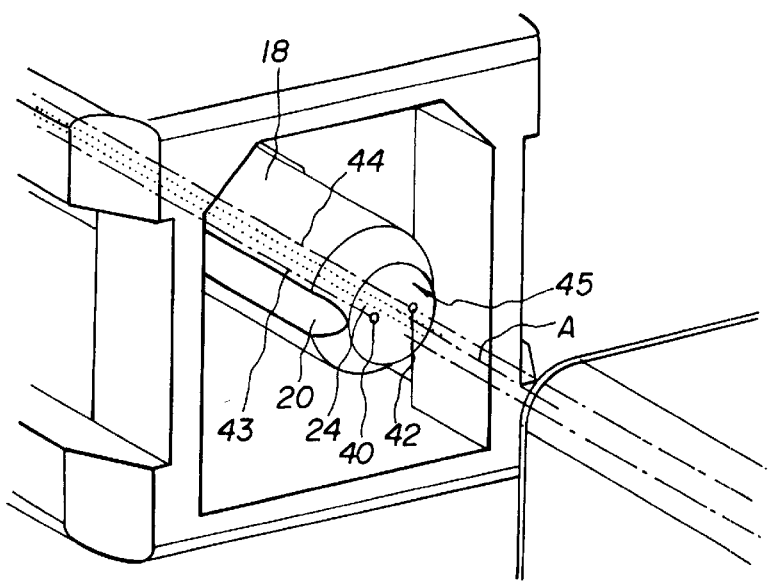
FIG. 2 is an enlarged view of a portion of FIG. 1 of the region between the connector end face and the module.
Figure 3:
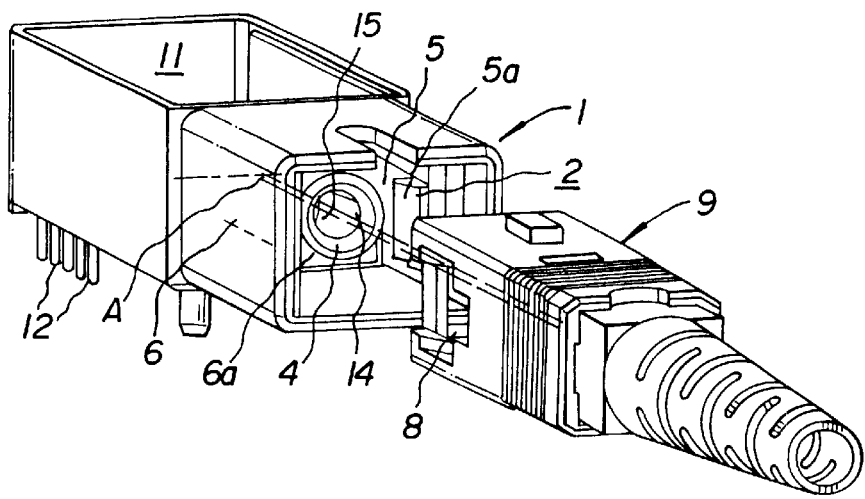
FIG. 3 is perspective view which is reversed relative to FIG. 1 and which shows the module from the rear.

To aid clarity, the illustrations in FIGS. 1 to 3 show the connector shortly before being completely inserted into the connection port.

Referring now to the figures of the drawing in detail and first, particularly, to FIGS. 1 and 3 thereof, there is seen a multichannel optical module having a connection port 1 which, with regard to its essential dimensions (in particular with reference to a mechanical lock 2 and a holding sleeve 4), is constructed as a complementary SC receptacle for holding an SC connector in accordance with the Japanese Industry Standard JIS-C-5973-1999. Reference is hereby expressly made to Industry Standard JIS-C-5973-1990. The mechanical lock 2 comprises two locking arms 5, 6, which latch with locking noses 5a, 6a into corresponding undercuts 8, 9 of a connector housing 10 when the connector is introduced completely into the connection port 1. The module also comprises a housing 11 and a plurality of electrical connecting contacts 12, which can be arranged, for example, in two rows of 5 contacts each, or in another way (for example 1*9 or 2*10).

With reference to FIG. 3, the holding sleeve 4 is provided on the inside with longitudinal elevations, for example in the form of longitudinal webs or longitudinal ribs 14, 15, which point in the radial direction toward the longitudinal axis A of the holding sleeve 4. The longitudinal webs 14, 15 serve as alignment aids which cooperate with longitudinal grooves or ridges 20, 21 constructed opposite on the circumference of a connector pin 18 (FIGS. 1 and 2).

As FIG. 2 illustrates, the cooperation of the alignment aids 14, 15 and 20, 21 ensures that a central longitudinal plane 24 including the connector pin longitudinal axis A is aligned in a defined position with reference to the module as soon as the connector pin 18 is inserted into the holding sleeve 4. Apart from the integral formation of webs in the holding sleeve 4, many other configurations are conceivable as alignments aids; for example, the sleeve can have centering pins which are arranged in a plane 24 on both sides of its longitudinal axis and cooperate with suitable grooves or bores in the connector pin 18.

A plurality of electrooptical transducers 26, 28 are arranged in the module housing 11. The transducers can be laser diodes which emit light with a wavelength of 850 nm or 1300 nm. In the exemplary embodiment according to FIG. 1, only two transducers are shown, by way of example. The transducers 26, 28 or their optical active zones are projected via a coupling member 30 onto a cross sectional plane, which coincides with the end face of the plugged-in connector pin 18, in such a way that waveguides 31, 32 run between the transducers 26, 28 and the ends 40, 42 of two optical conductors 43, 44 arranged jointly in the plane 24. A likewise suitable coupling member is disclosed in the commonly assigned, copending application Ser. No. 09/509,436 (see PCT publication WO 99/15927), the disclosure of which is herewith incorporated by reference. It is also possible, for example, for four optical conductors to be arranged in the plane 24 and to terminate at the end face 45 of the connector pin 18. The module therefore provides a plurality of separate data transmission channels which can be coupled to separate and individual optical conductor ends which are arranged in a common SC connector.

Figure 4:
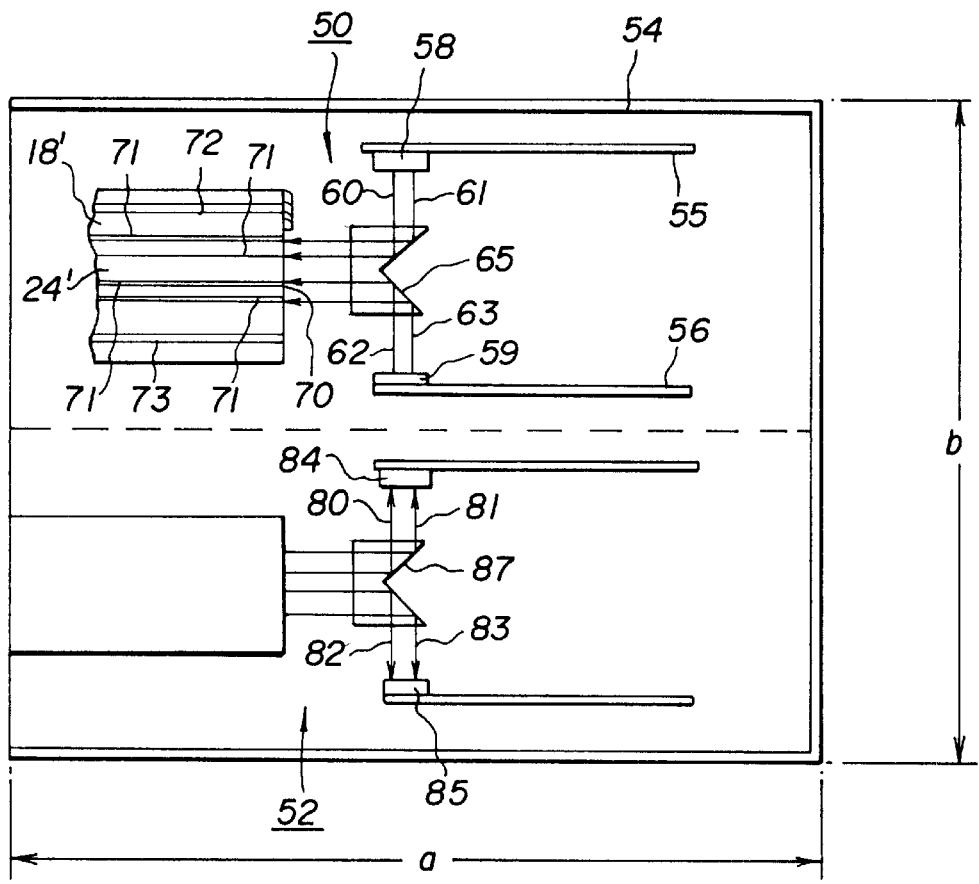
FIG. 4 is a plan view of a module configuration according to the invention.

FIG. 4 shows a module assembly in which two modules 50, 52 according to the invention are accommodated in a common housing 54, which is illustrated as open. The base area of the housing has dimensions of a=39.12 mm and b=25.40 mm, and thereby corresponds, for example, to the design size of the module described at the beginning. For the sake of clarity, FIG. 4 illustrates in a greatly simplified and diagrammatic fashion only the parts of the module assembly which are particularly important for the following explanation.

The module 50 contains two printed circuit boards 55, 56 on which one control circuit each for two laser arrays 58, 59 is placed. The laser arrays 58, 59 are constructed as surface emitting lasers (so-called vertically emitting lasers/VCSEL). The beam path runs via waveguides 60 to 63 partially through a common coupling member 65, and is deflected in each case at a mirror surface. As illustrated in outline, the coupling member 65 spreads open the course of the path on the transducer side, the result being to obtain more design space and spacing between the printed circuit boards 55, 56. The waveguides 60 to 63 image the active zones of the individual lasers on a common coupling plane 70 in which the end faces of four optical conductor ends, which are illustrated in outline and run in the connector pin 18' are situated. The connector pin 18' is situated with its face on a stop surface. In the partly broken-away illustration in the upper part of FIG. 4 alignment aids, on the connection port side, in the form of centering pins 72, 73 can be detected in outline along the connector pin 18'. These centering pins cooperate in conjunction with the cutouts or longitudinal grooves, described in FIGS. 1 to 3, of the connector pin 18' in such a way that the plane 24 containing the optical conductor ends 71 is aligned with the plane of the waveguides 60 to 63. For the purpose of simplification, the locking elements of the modules 50, 52 are not shown in FIG. 4.

The elements already described in principle are illustrated greatly simplified in the lower part of FIG. 4. As illustrated by appropriate arrows of the waveguides 80 to 83, the electrooptical transducers are constructed in the case of module 52 as receiving arrays 84, 85 which each have a plurality (for example 2) of photosensitive zones. The beam path or the waveguides 80, 82 otherwise run in a way previously described via a common coupling member 87. The module arrangement according to FIG. 4 therefore respectively has four transmitting or receiving channels in a design size which corresponds to conventional transceiver housings with only one separate receiving channel and one separate transmitting channel. The coupling to the module arrangement can advantageously be performed by means of so-called SC-DC (Dual Connector) or SC-QC (Quadruple Connector) connectors, each connector corresponding as regards its essential dimensions and locking mechanisms to the above-mentioned SC standard, and terminating the optical conductors respectively running in a common plane.

The particularly preferred combinations which can be implemented with the aid of the design principle of the module according to the invention are summarized by way of example in the following Table 1; of course, other refinements can also be realized without departing from the scope of the present invention.

TABLE 1

| Packing density/<br>Connection port | SFF<br>[SmallFormFactor]<br>SC-DC | SFF<br>[SmallFormFactor]<br>SC-QC | LCF<br>[LowCostFDDI]<br>SC-DC | LCF<br>[LowCostFDDI]<br>SC-QC |
|---|---|---|---|---|

TABLE 1-continued

| | | | | |
|---|---|---|---|---|
| Connection contacts [Row(s)*Number] | 1*9; 2*5; 2*10 | 1*9; 2*5; 2*10 | 1*9; 2*5; 2*10 | 1*9; 2*5; 2*10 |
| Light source/ Transmitter | VCSEL, LED, laser diode | VCSEL, LED, laser diode | VCSEL, LED, laser diode | VCSEL, LED, laser diode |
| Wavelength [nm] | 850/1300 | 850/1300 | | |
| Function | Transceiver TRX | 4-fold receiver Rx or 4-fold transmitter Tx | 2-fold transceiver TRX | 4-fold receiver Rx and 4-fold transmitter Tx |
| Number of channels/ optical conductors | 2 | 4 | 4 | 8 |

We claim:

1. A multichannel optical module for receiving a connector of the type having a connector housing with shaped elements and a substantially cylindrical connector pin in the housing with a plurality of optical conductors arranged in a central longitudinal plane, the module comprising:
   a housing formed with a connection port for receiving a connector along a plug-in direction and locking the connector therein;
   a plurality of electrooptical transducers assigned to said connection port, said transducers being optically aligned via waveguides next to one another with a coupling plane oriented perpendicular to the plug-in direction;
   a common coupling member; said waveguides extending in said common coupling member and spreading open toward said transducers, and said waveguides extending between said transducers and said central longitudinal plane;
   said connection port having a cylindrical holding sleeve for a connector pin of the connector, and locking elements cooperating mechanically with shaped elements of the connector housing; and
   alignment aids formed on said holding sleeve for mutually aligning said connection port and the connector pin of the connector, said alignment aids cooperating with corresponding alignments aids on the connector pin such that in the region of the coupling plane a respective one of said transducers is coupled individually to an end of a respective one of the optical conductors.

2. The module according to claim 1, wherein said alignments aids are longitudinal webs constructed on an inside of said holding sleeve.

3. The module according to claim 1, wherein said alignments aids are longitudinal ribs constructed on an inside of said holding sleeve.

4. The module according to claim 1, wherein said holding sleeve has a defined longitudinal axis and said alignment aids are centering pins arranged on both sides of the longitudinal axis of said holding sleeve.

5. The module according to claim 1, wherein the connector terminates two optical conductors at the end and the module comprises two transducers.

6. The module according to claim 1, wherein the connector terminates four optical conductors at the end and the module comprises four transducers.

7. The module according to claim 1, wherein said transducers are vertically emitting laser transmitters.

8. The module according to claim 7, wherein said laser transmitters have an emission wavelength selected from the group consisting of 850 nm and 1300 nm.

9. A module assembly comprising two modules according to claim 1, wherein said transducers in one of the modules are transmitters, and said transducers of the other module are receivers.

10. The module assembly according to claim 9, which comprises a common housing accommodating the two modules.

11. The module assembly according to claim 10, wherein said common housing has a base area not exceeding 26 mm*40 mm.

12. The module assembly according to claim 10, wherein said common housing has a base area not exceeding 25.40 mm*39.12 mm.

* * * * *